(12) United States Patent
Herbrich et al.

(10) Patent No.: US 7,246,103 B2
(45) Date of Patent: Jul. 17, 2007

(54) PROBABILISTIC MODEL OF DISTRACTION FOR A VIRTUAL REALITY ENVIRONMENT

(75) Inventors: Ralf Herbrich, Cambridge (GB); Michael E. Tipping, Cambridge (GB); Mark Hatton, Suffolk (GB)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 10/609,703

(22) Filed: Jun. 30, 2003

(65) Prior Publication Data

US 2004/0267683 A1 Dec. 30, 2004

(51) Int. Cl.
*G06F 15/00* (2006.01)
*G06F 15/18* (2006.01)
(52) U.S. Cl. ......................................... 706/62; 706/12
(58) Field of Classification Search .................. 706/12, 706/62; 434/156
See application file for complete search history.

(56) References Cited

U.S. PATENT DOCUMENTS

| | | | |
|---|---|---|---|
| 6,195,626 B1 | 2/2001 | Stone | 703/8 |
| 6,199,030 B1 | 3/2001 | Stone | 703/8 |
| 6,290,357 B1 * | 9/2001 | Massengill et al. | 351/209 |
| 6,422,869 B1 * | 7/2002 | Nagarajan et al. | 434/156 |
| 6,487,304 B1 | 11/2002 | Szeliski | 382/107 |
| 6,757,824 B1 * | 6/2004 | England | 713/156 |
| 6,798,443 B1 * | 9/2004 | Maguire, Jr. | 348/121 |
| 6,958,752 B2 * | 10/2005 | Jennings et al. | 345/420 |

OTHER PUBLICATIONS

Solving sequential decision-making problems under virtual reality simulation system Yang Xianglong; Feng Yuncheng; Li Tao; Wang Fei; Simulation Conference, 2001. Proceedings of the Winter vol. 2, Dec. 9-12, 2001 pp. 905-912 vol. 2 Digital Object Identifier 10.1109/WSC.2001.977392.*

Analysis on steady state behavior of DEVS models Ahn, M.S.; Kim, T.G.; AI, Simulation, and Planning in High Autonomy Systems, 1993. 'Integrating Virtual Reality and Model-Based Environments'. Proceedings. Fourth Annual Conference Sep. 20-22, 1993 pp. 142-147 Digital Object Identifier 10.1109/AIHAS.1993.410589.*

Modeling tumor growth and irradiation response in vitro-a combination of high-performance computing and Web-based technologies including VRML visualizationStarnatakos, G.S.; Zacharaki, E.I.; Makropoulou, M.; Mouravliansky, N.A.; Marsh, A.; Nikita, K.S.; Uzunoglu, N.K.; Information Technology in Biomedicine, IEEE Transactions on vol. 5, Issue 4.*

(Continued)

*Primary Examiner*—Anthony Knight
*Assistant Examiner*—Michael B. Holmes

(57) ABSTRACT

Improved human-like realism of computer opponents in racing or motion-related games is provided. The computer driver may be "distracted" by various characteristics, such as nervousness caused by another competitor closing the gap behind a computer driver. The distraction effects may be reflected in the alteration of stimuli to represent the computer driver "missing" stimuli, as though the AI competitor has taken its virtual eyes away from the course in front of its vehicle for an extended time period in order to watch the racing vehicle behind it. In addition, some distractions may be caused by different directional stimuli. When it is determined that an AI driver has glanced into the rear view mirror, visual stimuli from in front of the vehicle may be skipped because a human driver would not be able to simultaneously process visual stimuli from both the front of the vehicle and the rear view mirror.

42 Claims, 6 Drawing Sheets

OTHER PUBLICATIONS

Toward Disambiguating Multiple Selections for Frustum-Based Pointing Schmidt, G.; Baillot, Y.; Brown, D.G.; Tomlin, E.B.; Swan, J.E.; Virtual Reality, 2006. IEEE Mar. 25-29, 2006 pp. 129-129 Digital Object Identifier 10.1109/VR.2006.133.*

Toward Disambiguating Multiple Selections for Frustum-Based Pointing Schmidt, G.; Baillot, Y.; Brown, D.G.; Tomlin, E.B.; Swan, J.E.; 3D User Interfaces, 2006. 3DUI 2006. IEEE Symposium on Mar. 25-29, 2006 pp. 87-94 Digital Object Identifier 10.1109/VR.2006.133.*

Bennewitz, M., Burgard, W., Thrun, S.; "Using EM to Learn Motion Behaviors of Persons with Mobile Robots" ; Proceedings of the 2002 IEEE/RSJ International Conference on Intelligent Robots and Systems EPFL, Lausanne, Switzerland, Oct. 2002, pp. 502-507.

* cited by examiner

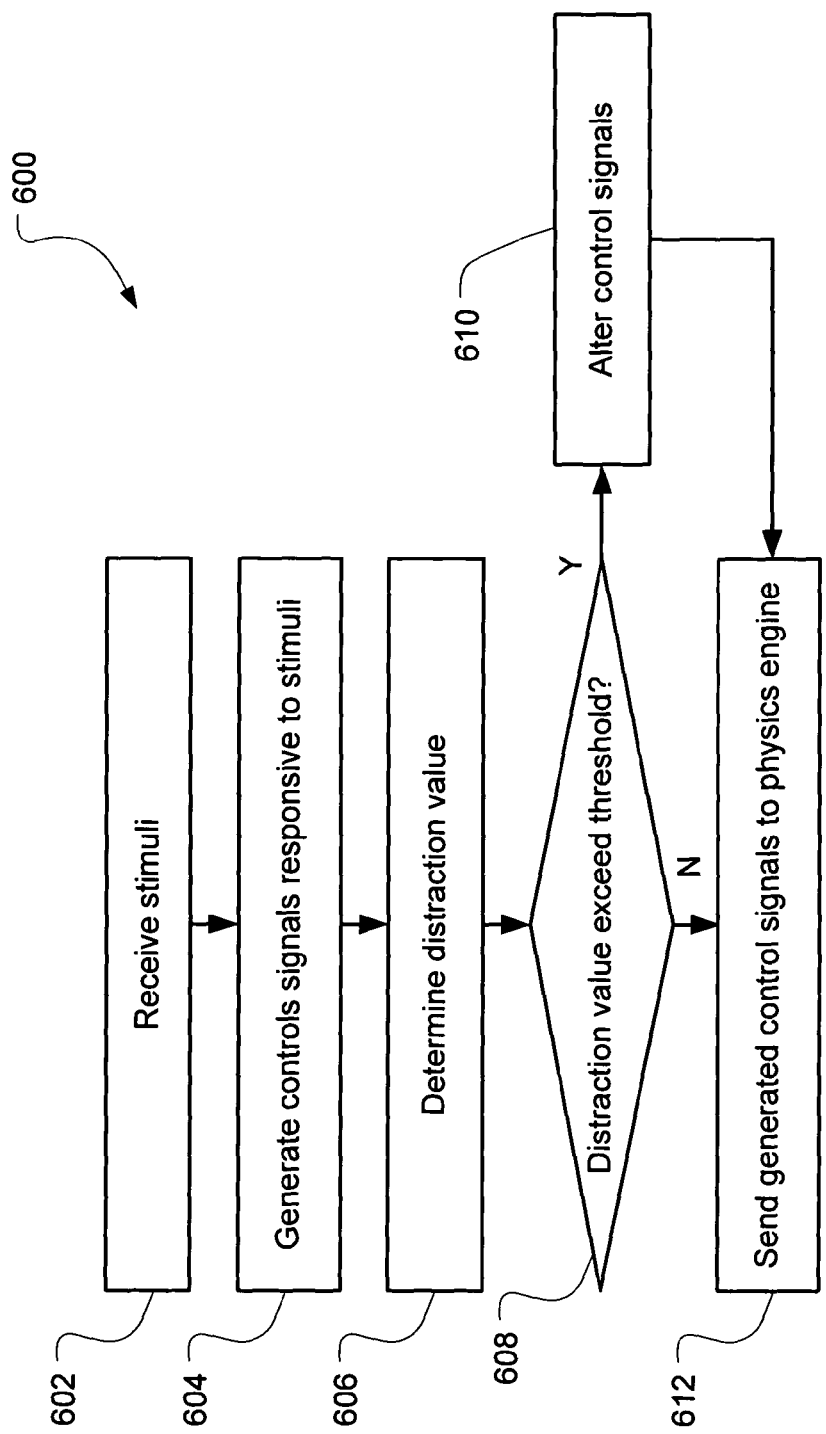

PROBABILISTIC MODEL OF DISTRACTION FOR A VIRTUAL REALITY ENVIRONMENT

RELATED APPLICATIONS

This application is related to U.S. Patent Application No. US 2004/0266526 A1, entitled "MODIFIED MOTION CONTROL FOR A VIRTUAL REALITY ENVIRONMENT"; U.S. Patent Application No. US 2004/0266506 A1, entitled "PERSONALIZED BEHAVIOR OF COMPUTER CONTROLLED AVATARS IN A VIRTUAL REALITY ENVIRONMENT"; and U.S. Patent Application No. US 2004/0263693, entitled "MIXTURE MODELS FOR MOTION LINES IN A VIRTUAL REALITY ENVIRONMENT", all filed concurrently herewith, specifically incorporated herein by reference for all that they disclose and teach.

TECHNICAL FIELD

The invention relates generally to virtual reality environments, and more particularly a probabilistic model of distraction for a virtual reality environment.

DESCRIPTION

Most racing-based computer games provide a mode for competing against computer-controlled opponents, which use a simple form of artificial intelligence (AI) to negotiate the race track or course in a simulated "human-like" fashion. However, despite the "human-like" goal of such AI, the result tends to appear quite non-human upon close observation. For example, the computer opponent may travel along an ideal or prescribed racing line on the course, whereas a human competitor inadvertently introduces continuous imperfections into his or her driving, such as over/under turning, over/under accelerating, over/under braking, and early/late reactions. However, it is just such imperfections that characterize a "human-like" competitor.

A typical AI motion control system effectively provides a computer opponent with a reaction time of $1/60^{th}$ of a second in the USA or $1/50^{th}$ of a second in Europe (i.e., for each frame repaint interval in the virtual reality environment). Therefore, computer control of the AI opponent in reaction to any "visual" (e.g., distance to a corner) and "physical" (e.g., loss of traction) stimuli from the virtual reality environment occurs 50 or 60 times a second. No human player can react so quickly, so frequently, or so perfectly as to compete with such a perfect computer controlled opponent.

One specific source of the non-human-like behavior of computer opponents is that the typical AI motion control system does not suffer from the same virtual environment distractions that a human competitor might. For example, the AI competitor may appear generally immune to the nervousness of having another competitor on its tail. Likewise, other distractions such as accidents can also distract a human driver, while the computer competitor does not get distracted. Although both drivers are likely to attempt to avoid any obstacles in their paths, such as crashed vehicles and debris, distractions tend to diminish the performance of the human competitor while not impacting the computer controlled driver's performance at all.

Implementations described and claimed herein enhance the human-like realism of computer opponents in racing-type games and other motion-related games. In one implementation, a computer driver is "distracted" by various events, such as nervousness caused by another competitor closing the gap behind the computer driver. The distraction effects may be reflected in the duplication or alteration of stimuli in current and subsequent simulation intervals to represent the computer driver "missing" stimuli for a given duration. That is, it is as though the AI competitor has taken its virtual eyes away from the course in front of its vehicle for an extended period of time (or more frequently) than is prudent in order to watch the pursuing vehicle behind it. Other distractions may also be modeled in this manner, including low fuel alerts, communications from the pit, accidents on the course, sunlight in the driver's eyes, etc.

In addition, some distractions may be caused by different directional stimuli sets. For example, when it is determined that an AI driver has glanced into the rear view mirror, visual stimuli from in front of the vehicle may be skipped to mimic a human driver, who would not be able to simultaneously (e.g., within a single frame or simulation interval) process visual stimuli from both the front of the vehicle and the rear view mirror.

Brief descriptions of the drawings included herein are listed below.

FIG. 6 illustrates alternative exemplary operations for modifying motion simulation in response to virtual distractions.

Figure 1:
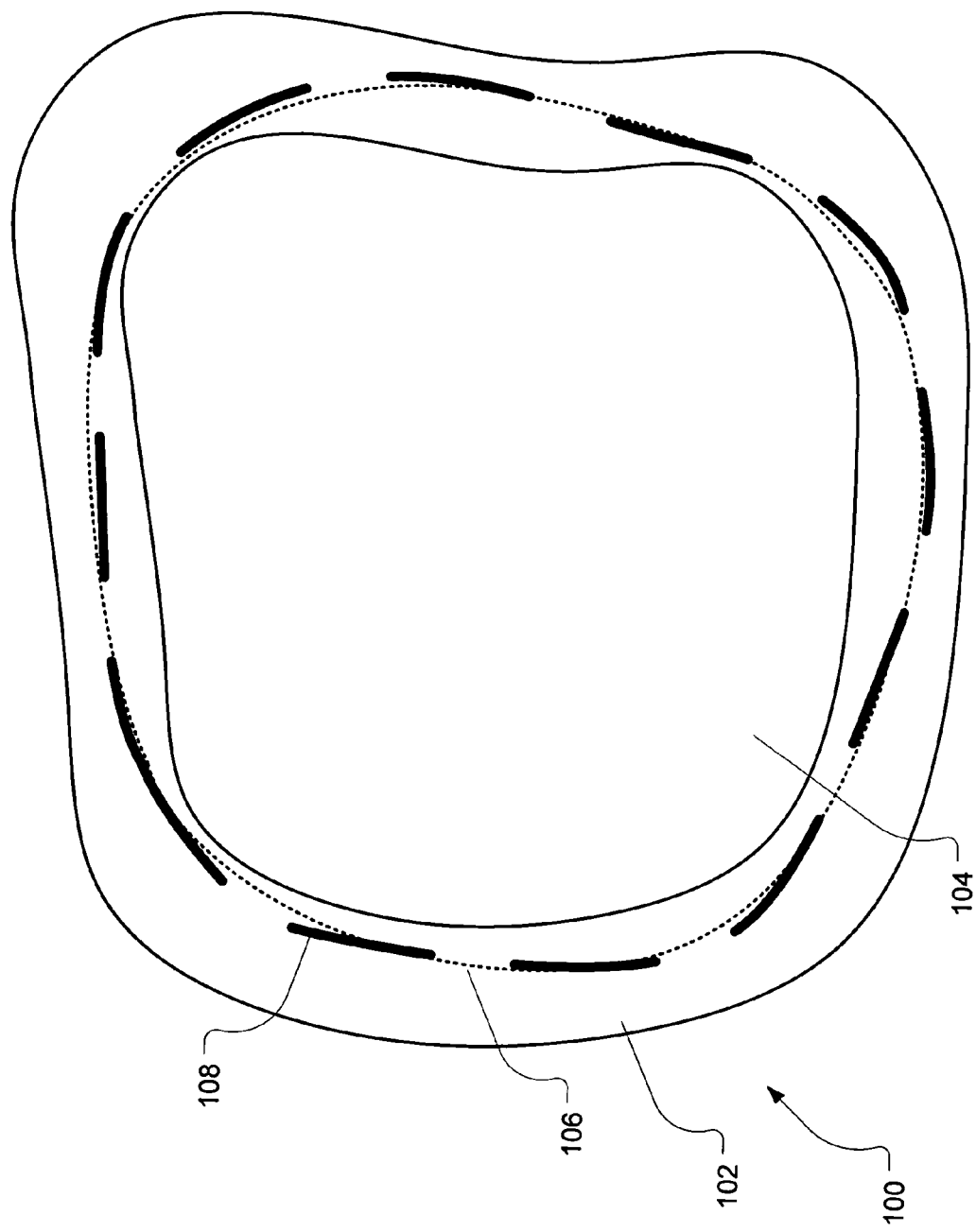
FIG. 1 illustrates a race course, an exemplary prescribed racing line, and an exemplary simulated path of a virtual vehicle.

Racing-based computer games typically include a mode in which one or more human players can compete against one or more computer-controlled opponents. For example, a human player may drive a virtual race car against a computer-controlled virtual race car purported to be driven by Mario Andretti or some other race car driver.

In one implementation, the behavior of the computer-controlled virtual vehicle may be made more human-like by introducing distractions into the performance of the AI driver. It should also be understood that implementations may be applied to various types of racing games, including boat racing, skiing, skating, plane racing, etc., and other types of non-racing motion-based simulations, including combat simulations, reality simulations, etc.

In various implementations, articles of manufacture are provided as computer program products. One implementation of a computer program product provides a computer program storage medium readable by a computer system and encoding a computer program for a virtual reality environment. Another implementation of a computer program product may be provided in a computer data signal embodied in a carrier wave by a computing system and encoding the computer program for a virtual reality environment.

The computer program product encodes a computer program for executing on a computer system a computer process for a virtual reality environment. A distraction probability value is computed for a current simulation interval. Stimuli received from a virtual reality environment in a current simulation interval are modified to produce altered stimuli, if the probability value exceeds a distraction threshold.

In another embodiment, a method is provided, such that a distraction probability value is computed for a current simulation interval. Stimuli received from a virtual reality environment in a current simulation interval are modified to produce altered stimuli, if the probability value exceeds a distraction threshold.

In yet another embodiment, a system is provided, such that a distraction module computes a distraction probability value for a current simulation interval, and an alteration module modifies stimuli received from a virtual reality environment in a current simulation interval to produce altered stimuli, if the probability value exceeds a distraction threshold.

In yet another embodiment, a computer program product provides a computer process that computes a distraction probability value for a current simulation interval. In addition, the computer process modifies controls signals to produce altered control signals, if the probability value exceeds a distraction threshold, the control signals being generated as input to a physics engine to control motion of an entity in a virtual reality environment in a current simulation interval.

In yet another embodiment, a method is provided, such that a distraction probability value is computed for a current simulation interval. In addition, controls signals are modified to produce altered control signals, if the probability value exceeds a distraction threshold, the control signals being generated as input to a physics engine to control motion of an entity in a virtual reality environment in a current simulation interval.

In yet another embodiment, a system is provided, such that a distraction module computes a distraction probability value for a current simulation interval. In addition, an alteration module modifies controls signals to produce altered control signals, if the probability value exceeds a distraction threshold, the control signals being generated as input to a physics engine to control motion of an entity in a virtual reality environment in a current simulation interval.

In yet another embodiment, a method is provided such that motion of an entity in a virtual reality environment is controlled based on stimuli from a plurality of mutually exclusive directional stimuli sets.

In yet another embodiment, a computer program product encoding a computer program for executing on a computer system a computer process that controls motion of an entity in a virtual reality environment based on stimuli from a plurality of mutually exclusive directional stimuli sets.

In yet another embodiment, a system is provided that includes an artificial intelligence motion control system generating a control signal to control motion of an entity in a virtual reality environment based on stimuli from a plurality of mutually exclusive directional stimuli sets.

FIG. 1 illustrates a race course, an exemplary prescribed racing line, and an exemplary simulated path of a virtual race vehicle. A virtual race course 100 includes a racing surface 102 and an infield 104. It should be understood that an alternative course may not be closed or may be applied to a non-racing environment, such as a first person shooter game, a military simulation, or a reality simulation. As such, a computer controlled driver may be replaced by a computer controlled (or AI controlled) player represented by any moving object.

A prescribed racing line 106 is associated with the virtual race course 100. Such a prescribed racing line 106 is typically designed into the game by the game designers as the target line for the AI controlled drivers. Various types of prescribed racing lines may include ideal and non-ideal racing lines for a course and may be characterized by various ideal and non-ideal parameters, including steering, braking, speed, and acceleration parameter sequences. At a specified interval (such as a simulation interval or a frame interval, which may be equal in some implementations), an AI motion control system receives stimulus inputs and computes control signals based on these inputs to change the direction, speed, etc. of the computer racing vehicle. The changes are generally intended to bring the AI driver back into alignment with the prescribed racing line 106.

In contrast, a path 108 represents the line actually taken by an AI controlled driver in an implementation of the described system. The path 108 is a degraded version of the prescribed racing line 106. That is, additional effects, such as one or more distraction effects, have been introduced into the computer driver's control to simulate a more human-like performance. As such, the path 108 is less ideal (or less accurate as compared to the prescribed racing line) than the path of a typical computer controlled driver. The path 108 is also non-deterministic because it is defined based on a probabilistic model of whether a distraction occurs to alter either the control signals or stimuli.

Figure 2:
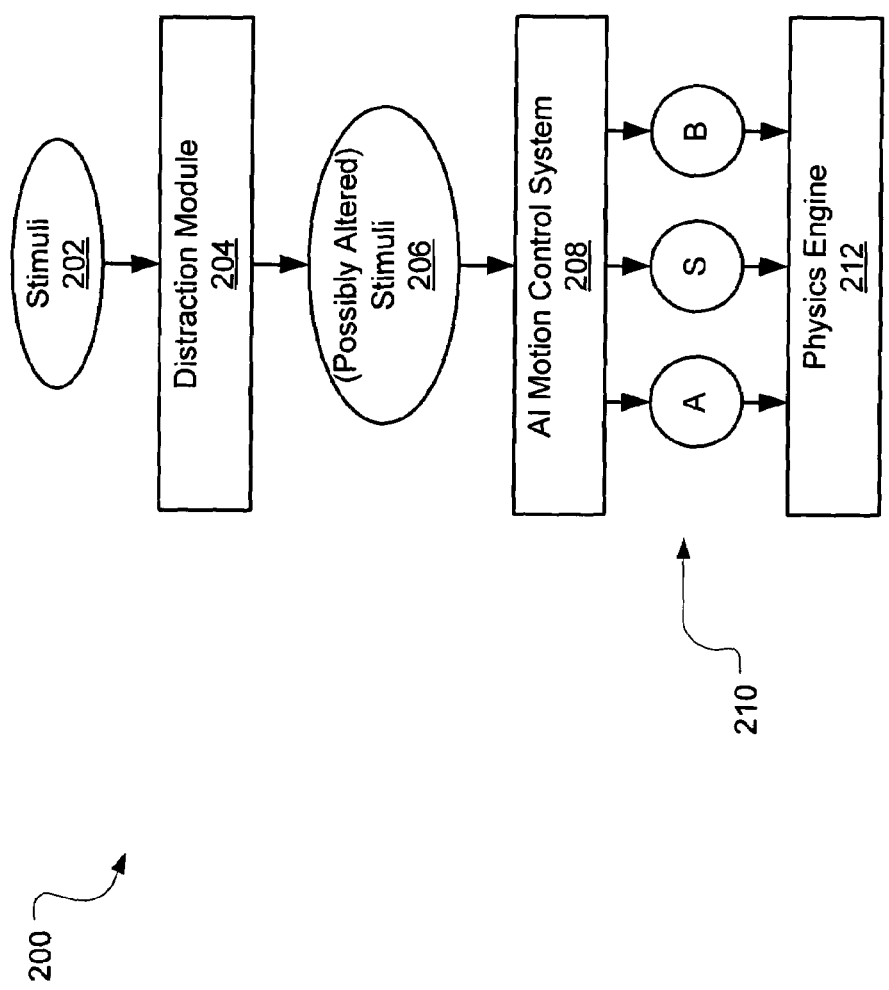
FIG. 2 illustrates exemplary components of a virtual racing game system.

FIG. 2 illustrates exemplary components of a virtual racing game system 200. In this implementation, stimuli 202 received from the virtual reality environment are input to a distraction module 204. Stimuli 202 may include various types of stimuli, including without limitation those stimuli listed below:

"Visual" stimuli—Includes structures, objects, actions, and characteristics which would be seen by a virtual driver controlling the race in the virtual reality environment (e.g., other racers, walls, obstacles, course markings, accident debris, etc.).

"Physical" stimuli—Includes non-visual sensations detected by a virtual driver controlling the racing vehicle in the virtual reality environment (e.g., loss of tire traction, heat, fatigue, audio signals, bumps by other vehicles, etc.).

Each type of stimuli may be represented by a stimulus signal, which in one implementation, includes a parameter value indicating the properties of the particular type of stimulus in a given simulation interval. For example, one visual stimulus signal may indicate the location of another driver on the course relative to the current driver. Furthermore, visual stimuli may be divided into directional components or sets, such as forward visual stimuli received from in front of the vehicle and rearward visual stimuli received through a rear view mirror or side view mirrors. These components may also be further decomposed (e.g., separating the stimuli from different mirrors).

Directional virtual stimuli may result in directional distractions. For example, seeing a vehicle approach in its rear view mirror may cause the AI driver to miss new forward visual stimuli for one or more frames. Likewise, seeing an accident in front of its vehicle may cause the AI driver to miss rearward visual stimuli for one or more frames. In addition, receipt of forward visual stimuli may be mutually exclusive with receipt of rearward visual stimuli in the same frame or set of frames because a human driver would not be able to effectively look forward and in the rear view mirror at the same time.

Examples of physical stimulus signals may indicate that the racing vehicle has lost traction and is skidding (e.g., a sideways motion), that the computer controlled vehicle has been hit by another vehicle or the wall, or that a sound of an accident has been heard to the AI driver's right side. Note that physical stimuli may also be directional in nature.

Each stimulus signal is received by the distraction module 204, which determines whether some portion of the AI driver's perception has been distracted. If so, the distraction module 204 alters all or a portion of the stimuli in the current simulation interval to reflect the distraction, thereby generating altered stimuli 206. If no distraction is determined, then the stimuli 206 are unchanged by the distraction module 204, thereby outputting stimuli 206 that are unaltered from input stimuli 202. The stimuli 206 are input to an AI motion control system 208, which computes control signals 208 responsive to the stimuli 206, where "A" represents an acceleration control signal, "S" represents a steering control signal, and "B" represents a braking control signal. It should be understood, however, that other types of control signals are contemplated, including without limitation a speed control signal. The control signals 210 are input to a physics engine 212, which applies the control signals to the racing vehicle to simulate the motion of the AI controlled racing vehicle within the virtual reality environment.

Figure 3:
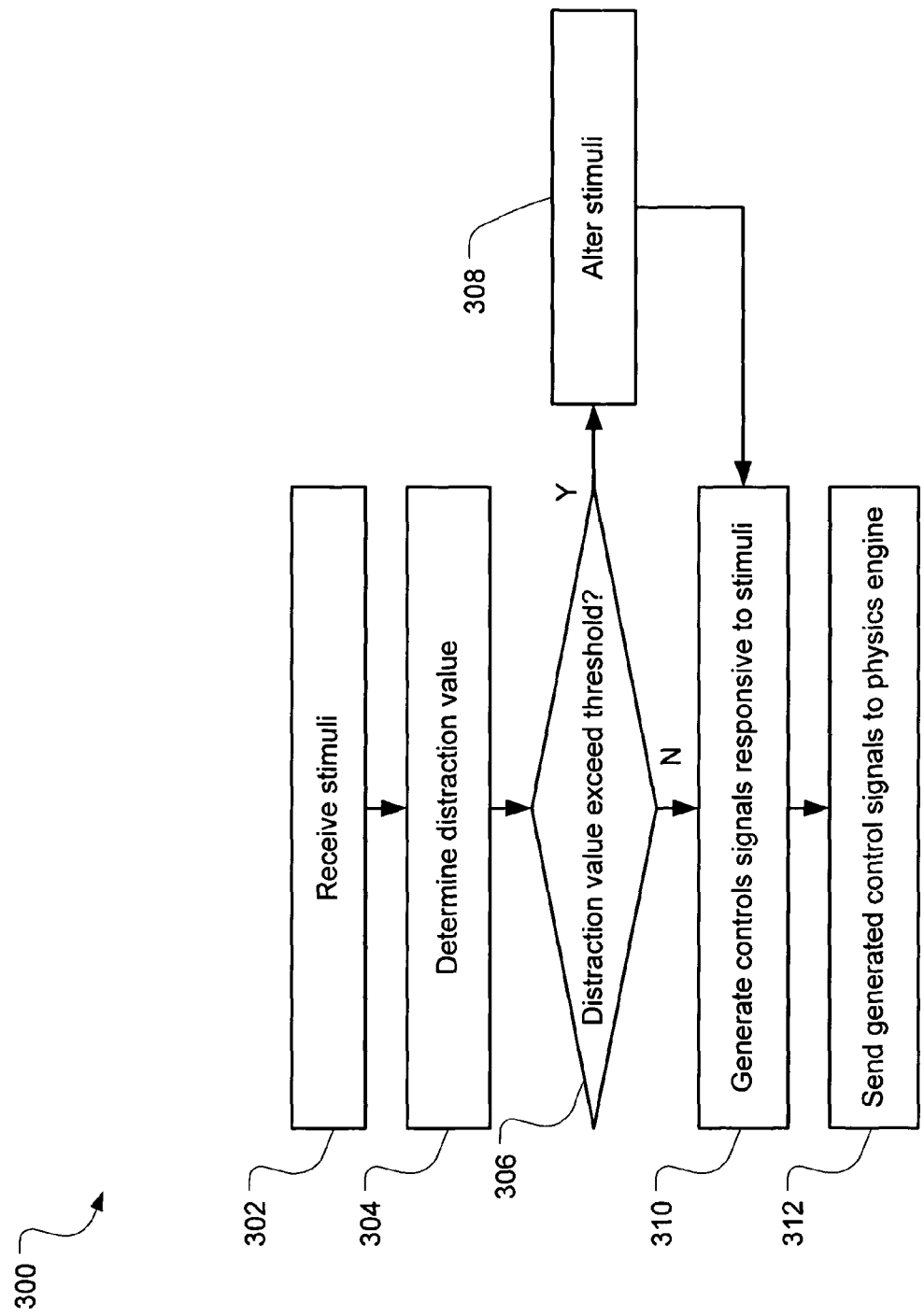
FIG. 3 illustrates exemplary operations for modifying motion simulation in response to virtual distractions.

FIG. 3 illustrates exemplary operations 300 for modifying motion simulation in response to virtual distractions. In one implementation, each loop from operation 302 to operation 312 may be considered a simulation interval.

At each simulation interval (e.g., a frame interval), a receiving operation 302 receives stimuli from the virtual reality environment. A determination operation 304 determines whether a distraction has been detected based on the received stimuli from the current simulation interval. Various methods can be used to determine whether a given set of stimuli in a simulation interval distracts the AI driver. For example, a weighted combination of stimuli may be used to determine whether and to what extent a user is distracted. A portion of an exemplary distraction algorithm is shown below:

$$D = \alpha A + (1-\alpha)L \quad (1)$$

A portion of another exemplary distraction algorithm is shown below:

$$D = A \times L \quad (2)$$

In Equations 1 and 2, D represents a distraction factor and α represents a weighting parameter used to control the strength of the contribution of different stimuli to the distraction factor. A represents a stimulus value between zero and one relating to detection of an approaching competitor from behind the AI driver, and L represents a lap factor between zero and one, such as the percentage of completed laps in the entire race. In this exemplary algorithm, the distraction factor D increases between zero and one as pursuing competitors are detected (and close the gap) and the number of laps remaining in the race decreases. One might also add a contribution based on the AI drivers placement in the race, where drivers in the lead are more easily distracted than drivers at the rear of the pack.

Other contributions may also be considered, such as randomizing contributions. In addition, multiple distraction factors may also be computed and used in combination or independently to influence the AI driver's performance (e.g., all distraction factors may be used to influence one or more AI driver controls, such as steering, braking, etc., or individual distraction factors may be used to influence individual AI driver controls).

The distraction factor or factors are tested against a distraction threshold or multiple distraction thresholds in a decision operation 306. For example, in the case of a single distribution factor and a single distribution threshold, if the distribution factor exceeds the distribution threshold, it is determined that the AI driver has been distracted in the current simulation interval. In one implementation, the distribution factor may be limited (or clipped) at a maximum distraction value (e.g., 0.75) to maintain some possibility of avoiding the distraction (e.g., to prevent an AI driver from becoming paralyzed by distraction). This clipping may be accomplished for example, by a clipping module (not shown) in the distraction module.

In one implementation, if a distraction is determined, an altering operation 308 replaces the stimuli for the current simulation interval with stimuli from a previous interval (such as the immediately preceding simulation interval) or otherwise alters the stimuli for the current interval to model a distraction (e.g., the AI driver takes its eyes off of the road in front of it). Some or all of the stimuli for a given interval may be so altered and then passed as altered stimuli to a control operation 310. If no distraction is determined, the stimuli for the current interval are passed unchanged to the control operation 310. The control operation 310 generates control signals based on the received stimuli. A transmission operation 312 sends the control signals to the physics engine to apply them to the virtual reality environment.

In one implementation, the strength of the distraction factor may influence the number of intervals during which the distraction continues. For example, if the difference between the distraction factor and the distraction threshold is large, the stimuli from the previous interval may be duplicated for the next five intervals, instead of just one interval.

In another implementation, a distraction may be extended for multiple simulation intervals using filtering. This approach mimics a human-like response—if a human driver is aware of a closely pursuing competitor, the possibility of nervousness or distraction of that human driver continues (but decreases) for a time after the pursuer slips from sight (e.g., around a curve). The human driver is apt to continue glancing in the rear view mirror to keep track of the pursuer, whether the pursuer is visible at the moment or not.

As such, once a distraction is experienced in one interval of such an implementation, the distraction factor may be filtered for one or more subsequent intervals so as not to decay instantaneously or too quickly. For example, using the proposed filtering algorithm in Equation (3) below, the distraction may be continued to a lesser extent for multiple intervals.

$$D_t' = \beta D_t + (1-\beta) D_{t-1} \quad (3)$$

where $D_t$ represents an original distraction factor in the current interval, $D_{t-1}$ represents the distraction factor from the previous interval, β represents a weighting factor, and $D_t'$ represents the filtered distraction factor in the current interval. The filtered distraction factor is applied to a distraction threshold as described above in order to determine whether a distraction has occurred. Other filtering approaches may also be employed. For example, a distraction threshold may be altered (e.g., increased or decreased) in one or more simulation intervals after a distraction is detected to decrease or increase the likelihood of a distraction continuing for multiple simulation sequential intervals.

Figure 4:
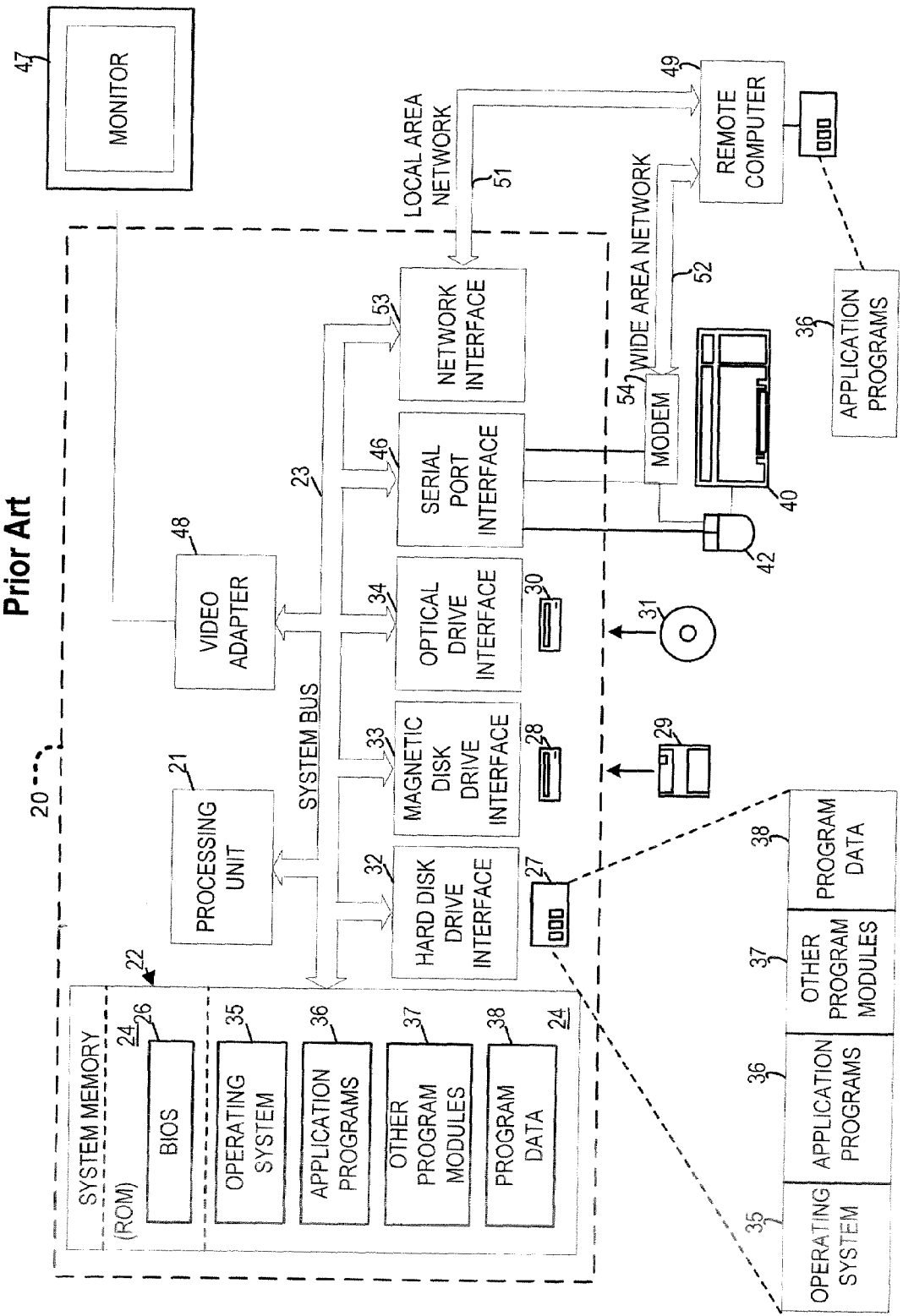
FIG. 4 illustrates an exemplary system useful for implementing an embodiment of the present invention.

The exemplary hardware and operating environment of FIG. 4 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, AI motion control systems, physics engines, distraction modules, or other modules may be incorporated as part of the operating system 35, application programs 36, or other program modules 37. The stimuli signals, distraction factors, and control signals may be stored as program data 38.

Figure 5:
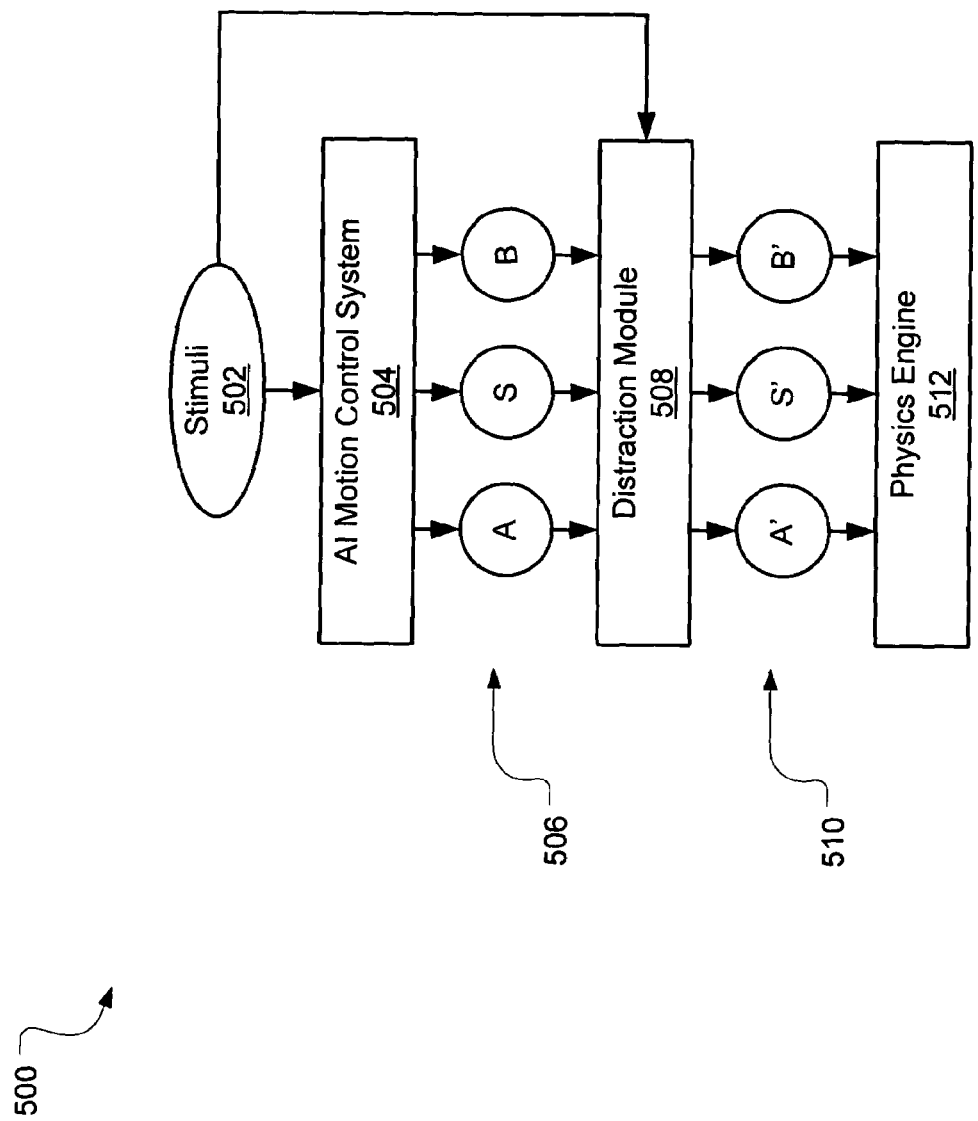
FIG. 5 illustrates alternative exemplary components of a virtual racing game system.

FIG. 5 illustrates alternative exemplary components of a virtual racing game system 500. In a current simulation interval, stimuli 502 is received by an AI motion control system 504, which computes controls signals 506 in response thereto. The controls signals 506 are generated to maneuver an AI controlled vehicle along a course, where "A" represents an acceleration control signal, "S" represents a steering control signal, and "B" represents a braking control signal. It should be understood, however, that other types of control signals are contemplated, including without limitation a speed control signal.

A distraction module 508 receives the control signals 506 and the stimuli 502 for the current simulation interval and determines whether some portion of the AI driver's perception has been distracted. If so, the distraction module 506 alters all or a portion of the control signals in the current simulation interval to reflect the distraction, thereby generating altered control signals 510. If no distraction is determined, then the control signals 510 are unchanged by the distraction module 508, thereby outputting control signals 510 that are unaltered from control signals 506. The control signals 510 are input to a physics engine 512, which applies the control signals to the racing vehicle to simulate the motion of the AI controlled racing vehicle within the virtual reality environment.

FIG. 6 illustrates alternative exemplary operations for modifying motion simulation in response to virtual distractions. In one implementation, each loop from operation 602 to operation 612 may be considered a simulation interval.

At each simulation interval (e.g., a frame interval), a receipt operation 602 receives stimuli from the virtual reality environment. A reception operation 604 receives the stimuli and generates control signals based on the received stimuli. A determination operation 606 determines a probabilistic distraction value based on the received stimuli from the current simulation interval and a decision operation 608 determines whether a distraction has occurred. Various methods can be used to determine whether a given set of stimuli in a simulation interval distracts the AI driver. If a distraction has occurred, an altering operation 610 alters the control signals (e.g., replaces the controls signals of the current simulation interval with the control signals of a previous simulation interval) to simulate the effect of the distraction on the AI driver's performance. A transmission operation 612 sends the control signals or the altered control signals to the physics engine to apply them to the virtual reality environment.

In one implementation, the strength of the distraction factor may influence the number of intervals during which the distraction continues. For example, if the difference between the distraction factor and the distraction threshold is large, the controls signals from the previous interval may be duplicated for the next five intervals, instead of just one interval.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
   computing a distraction probability value for a current simulation interval;
   modifying stimuli received from a virtual reality environment in a current simulation interval to produce altered stimuli, if the probability value exceeds a distraction threshold;
   generating control signals based on the altered stimuli; and
   outputting the generated control signals to control motion of an entity in a virtual reality environment in the current simulation interval.

2. The method of claim 1 wherein the modifying operation comprises:
   replacing the stimuli received in the current simulation interval with stimuli from a previous simulation interval.

3. The method of claim 1 wherein the modifying operation comprises:
   replacing the stimuli received in the current simulation interval with stimuli from an immediately previous simulation interval.

4. The method of claim 1 further comprising:
   modifying stimuli received from the virtual reality environment in a subsequent simulation interval to produce altered stimuli for the subsequent simulation interval, if the distraction probability value for the current simulation interval exceeded the distraction threshold.

5. The method of claim 1 further comprising:
   computing a distraction probability value for a subsequent simulation interval; and
   modifying stimuli received from the virtual reality environment in the subsequent simulation interval to produce altered stimuli for the subsequent simulation interval, if the distraction probability value for the current simulation interval exceeded the distraction threshold and the distraction probability value of the subsequent simulation interval does not exceed the distraction threshold.

6. The method of claim 1 further comprising:
   reducing the distraction probability value of the current simulation interval to produce a distraction probability value of a subsequent simulation interval; and
   modifying stimuli received from the virtual reality environment in a subsequent simulation interval to produce altered stimuli for the subsequent simulation interval, if the distraction probability value for the subsequent simulation interval exceeds the distraction threshold.

7. The method of claim 1 further comprising:
   limiting the distraction probability value of the current simulation to a predefined value.

8. A computer program product encoding a computer program for executing on a computer system a computer process, the computer process comprising:
   computing a distraction probability value for a current simulation interval;
   modifying stimuli received from a virtual reality environment in a current simulation interval to produce altered stimuli, if the probability value exceeds a distraction threshold;
   generating control signals based on the altered stimuli; and
   outputting the generated control signals to control motion of an entity in a virtual reality environment in the current simulation interval.

9. The computer program product of claim 8 wherein the modifying operation comprises:
   replacing the stimuli received in the current simulation interval with stimuli from a previous simulation interval.

10. The computer program product of claim 8 wherein the modifying operation comprises:
    replacing the stimuli received in the current simulation interval with stimuli from an immediately previous simulation interval.

11. The computer program product of claim 8 wherein the computer process further comprises:
    modifying stimuli received from the virtual reality environment in a subsequent simulation interval to produce altered stimuli for the subsequent simulation interval, if the distraction probability value for the current simulation interval exceeded the distraction threshold.

12. The computer program product of claim 8 wherein the computer process further comprises:
    computing a distraction probability value for a subsequent simulation interval; and
    modifying stimuli received from the virtual reality environment in the subsequent simulation interval to produce altered stimuli for the subsequent simulation interval, if the distraction probability value for the current simulation interval exceeded the distraction threshold and the distraction probability value of the subsequent simulation interval does not exceed the distraction threshold.

13. The computer program product of claim 8 wherein the computer process further comprises:
    reducing the distraction probability value of the current simulation interval to produce a distraction probability value of a subsequent simulation interval; and
    modifying stimuli received from the virtual reality environment in a subsequent simulation interval to produce altered stimuli for the subsequent simulation interval, if the distraction probability value for the subsequent simulation interval exceeds the distraction threshold.

14. The computer program product of claim 8 wherein the computer process further comprises:
limiting the distraction probability value of the current simulation to a predefined value.

15. A system comprising:
a distraction module configured to compute a distraction probability value for a current simulation interval;
an alteration module configured to modify stimuli received from a virtual reality environment in a current simulation interval to produce altered stimuli, if the probability value exceeds a distraction threshold;
an artificial intelligence motion control system configured to generate a control signal based the altered stimuli and to output the generated control signal to control motion of an entity in the virtual reality environment in the current simulation interval.

16. The system of claim 15 wherein the alteration module replaces the stimuli received in the current simulation interval with stimuli from a previous simulation interval.

17. The system of claim 15 wherein the alteration module replaces the stimuli received in the current simulation interval with stimuli from an immediately previous simulation interval.

18. The system of claim 15 wherein the alteration module modifies stimuli received from the virtual reality environment in a subsequent simulation interval to produce altered stimuli for the subsequent simulation interval, if the distraction probability value for the current simulation interval exceeded the distraction threshold.

19. The system of claim 15 wherein the distraction module computes a distraction probability value for a subsequent simulation interval, and the alteration module modifies stimuli received from the virtual reality environment in the subsequent simulation interval to produce altered stimuli for the subsequent simulation interval, if the distraction probability value for the current simulation interval exceeded the distraction threshold and the distraction probability value of the subsequent simulation interval does not exceed the distraction threshold.

20. The system of claim 15 wherein the distraction module reduces the distraction probability value of the current simulation interval to produce a distraction probability value of a subsequent simulation interval, and the alteration module modifies stimuli received from the virtual reality environment in a subsequent simulation interval to produce altered stimuli for the subsequent simulation interval, if the distraction probability value for the subsequent simulation interval exceeds the distraction threshold.

21. The system of claim 15 further comprising:
a clipping module limiting the distraction probability value of the current simulate on to a predefined value.

22. A method comprising:
computing a distraction probability value for a current simulation interval;
modifying controls signals to produce altered control signals, if the probability value exceeds a distraction threshold and
outputting the control signals to a physics engine to control motion of an entity in a virtual reality environment in a current simulation interval.

23. The method of claim 22 wherein the modifying operation comprises:
replacing the control signals generated for the current simulation interval with control signals generated for a previous simulation interval.

24. The method of claim 22 wherein the modifying operation comprises:
replacing the control signals generated for the current simulation interval with control signals generated for an immediately previous simulation interval.

25. The method of claim 22 further comprising:
modifying control signals generated as input to the physics engine to control motion of the entity in the virtual reality environment in a subsequent simulation interval to produce altered control signals for the subsequent simulation interval, if the distraction probability value for the current simulation interval exceeded the distraction threshold.

26. The method of claim 22 further comprising:
computing a distraction probability value for a subsequent simulation interval; and
modifying control signals generated as input to the physics engine to control motion of the entity in the virtual reality environment in the subsequent simulation interval to produce altered control signals for the subsequent simulation interval, if the distraction probability value for the current simulation interval exceeded the distraction threshold and the distraction probability value of the subsequent simulation interval does not exceed the distraction threshold.

27. The method of claim 22 further comprising:
reducing the distraction probability value of the current simulation interval to produce a distraction probability value of a subsequent simulation interval; and
modifying control signals generated as input to the physics engine to control motion of the entity in the virtual reality environment in the subsequent simulation interval to produce altered control signals for the subsequent simulation interval, if the distraction probability value for the subsequent simulation interval exceeds the distraction threshold.

28. The method of claim 22 further comprising:
limiting the distraction probability value of the current simulation to a predefined value.

29. A tangible computer program product encoding a computer program for executing on a computer system a computer process, the computer process comprising:
computing a distraction probability value for a current simulation interval;
modifying controls signals to produce altered control signals if the probability value exceeds a distraction threshold; and
outputting the control signals to a physics engine to control motion of an entity in a virtual reality environment in a current simulation interval.

30. The computer program product of claim 29 wherein the modifying operation comprises:
replacing the control signals generated for the current simulation interval with control signals generated for a previous simulation interval.

31. The computer program product of claim 29 wherein the modifying operation comprises:
replacing the control signals generated for the current simulation interval with control signals generated for an immediately previous simulation interval.

32. The computer program product of claim 29 wherein the computer process further comprises:
modifying control signals generated as input to the physics engine to control motion of the entity in the virtual reality environment in a subsequent simulation interval to produce altered control signals for the subsequent simulation interval, if the distraction probability value for the current simulation interval exceeded the distraction threshold.

33. The computer program product of claim 29 wherein the computer process further comprises:
computing a distraction probability value for a subsequent simulation interval; and
modifying control signals generated as input to the physics engine to control motion of the entity in the virtual reality environment in the subsequent simulation interval to produce altered control signals for the subsequent simulation interval, if the distraction probability value for the current simulation interval exceeded the distraction threshold and the distraction probability value of the subsequent simulation interval does not exceed the distraction threshold.

34. The computer program product of claim 29 wherein the computer process further comprises:
reducing the distraction probability value of the current simulation interval to produce a distraction probability value of a subsequent simulation interval; and
modifying control signals generated as input to the physics engine to control motion of the entity in the virtual reality environment in the subsequent simulation interval to produce altered control signals for the subsequent simulation interval, if the distraction probability value for the subsequent simulation interval exceeds the distraction threshold.

35. The computer program product of claim 29 wherein the computer process further comprises:
limiting the distraction probability value of the current simulation to a predefined value.

36. A system comprising:
a distraction module configured to compute a distraction probability value for a current simulation interval; and
an alteration module configured to modify controls signals to produce altered control signals if the probability value exceeds a distraction threshold; and to output the control signals being generated to a physics engine to control motion of an entity in a virtual reality environment in a current simulation interval.

37. The system of claim 36 wherein the alteration module replaces the control signals generated for the current simulation interval with control signals generated for a previous simulation interval.

38. The system of claim 36 wherein the alteration module replaces replacing the control signals generated for the current simulation interval with control signals generated for an immediately previous simulation interval.

39. The system of claim 36 wherein the alteration module modifies control signals generated as input to the physics engine to control motion of the entity in the virtual reality environment in a subsequent simulation interval to produce altered control signals for the subsequent simulation interval, if the distraction probability value for the current simulation interval exceeded the distraction threshold.

40. The system of claim 36 wherein the distraction module computes a distraction probability value for a subsequent simulation interval, and the alteration module modifies control signals generated as input to the physics engine to control motion of the entity in the virtual reality environment in the subsequent simulation interval to produce altered control signals for the subsequent simulation interval, if the distraction probability value for the current simulation interval exceeded the distraction threshold and the distraction probability value of the subsequent simulation interval does not exceed the distraction threshold.

41. The system of claim 36 wherein the distraction module reduces the distraction probability value of the current simulation interval to produce a distraction probability value of a subsequent simulation interval, and the alteration module modifies control signals generated as input to the physics engine to control motion of the entity in the virtual reality environment in the subsequent simulation interval to produce altered control signals for the subsequent simulation interval, if the distraction probability value for the subsequent simulation interval exceeds the distraction threshold.

42. The system of claim 36 further comprising:
a clipping module limiting the distraction probability value of the current simulation to a predefined value.

* * * * *